United States Patent
Meunier et al.

(10) Patent No.: US 11,554,851 B2
(45) Date of Patent: Jan. 17, 2023

(54) SYSTEM AND METHOD FOR AIRCRAFT PROPELLER GOVERNING

(71) Applicant: PRATT & WHITNEY CANADA CORP., Longueuil (CA)

(72) Inventors: Gabriel Meunier, Saint-Bruno-de-Montarville (CA); Nicolas Des Roches-Dionne, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1008 days.

(21) Appl. No.: 16/277,310

(22) Filed: Feb. 15, 2019

(65) Prior Publication Data

US 2020/0262542 A1    Aug. 20, 2020

(51) Int. Cl.
*B64C 11/40* (2006.01)
*B64D 31/00* (2006.01)
*B64C 11/38* (2006.01)
*F01D 7/00* (2006.01)
*F02K 3/06* (2006.01)

(52) U.S. Cl.
CPC ............ *B64C 11/40* (2013.01); *B64C 11/385* (2013.01); *B64D 31/00* (2013.01); *F01D 7/00* (2013.01); *F02K 3/06* (2013.01); *F05D 2220/323* (2013.01); *F05D 2270/02* (2013.01); *F05D 2270/64* (2013.01)

(58) Field of Classification Search
CPC ........ B64C 11/40; B64C 11/385; B64C 31/00
See application file for complete search history.

(56) References Cited

U.S. PATENT DOCUMENTS

| 6,059,528 A * | 5/2000 | Danielson | B64C 11/40 416/61 |
| 7,602,081 B2 * | 10/2009 | Stonestreet, II | B64D 15/12 307/29 |
| 10,392,099 B2 * | 8/2019 | Pedrami | B64D 27/10 |
| 10,683,082 B2 * | 6/2020 | Lassalle | B64C 11/40 |
| 2018/0334242 A1 | 11/2018 | Pedrami et al. | |
| 2020/0088112 A1 * | 3/2020 | Tang | B64C 11/303 |
| 2020/0189721 A1 * | 6/2020 | Maver | B64C 11/40 |
| 2020/0369370 A1 * | 11/2020 | Des Roches-Dionne | B64C 11/42 |
| 2021/0180525 A1 * | 6/2021 | Meunier | B64D 27/10 |

* cited by examiner

*Primary Examiner* — Courtney D Heinle
*Assistant Examiner* — Ryan C Clark
(74) *Attorney, Agent, or Firm* — Norton Rose Fulbright Canada LLP

(57) ABSTRACT

Methods and systems for governing an aircraft propeller of an engine are described. The method comprises obtaining a fluid flow command for speed control of the propeller, determining pulse parameters of a pulse width modulated valve control signal for actuating a two-position solenoid valve in accordance with the fluid flow command based on an average fluid flow through the solenoid valve and an opening and closing time of the solenoid valve, generating the valve control signal with the pulse parameters as determined, and transmitting the valve control signal to the solenoid valve for actuating the solenoid valve, thereby controlling the speed of the propeller.

20 Claims, 8 Drawing Sheets

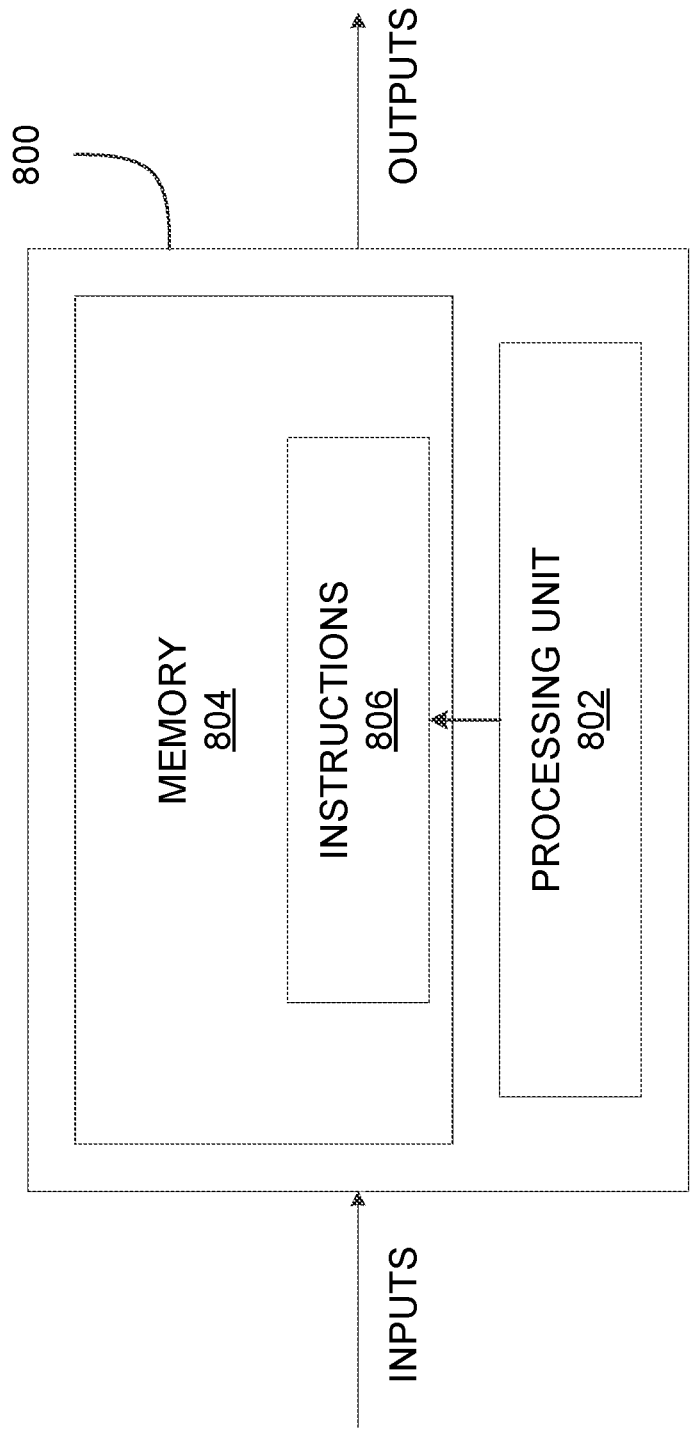

SYSTEM AND METHOD FOR AIRCRAFT PROPELLER GOVERNING

TECHNICAL FIELD

The present disclosure relates generally to engines, and more particularly to propeller governing of aircraft engines.

BACKGROUND OF THE ART

Constant speed propellers are controlled by varying blade angles to maintain the speed of the propeller at a reference speed. In order to do so, the blade angle is increased with increasing aircraft power and speed and decreased with decreasing aircraft power and speed. Varying the blade angle is achieved by either adding or removing oil in the propeller dome.

The primary means of adding or removing oil to the propeller is through a proportional valve that controls precisely the oil flow to maintain constant speed of the propeller. A backup mode of controlling oil flow to the propeller, sometimes used when the primary mode fails, is to use the feather solenoid valve. However, the feather solenoid valve is a two position valve, which does not allow precise control of oil flow therethrough. In addition, propeller speed cannot be maintained in a stable manner so as to allow the aircraft to pursue its flight.

Therefore, improvements are needed.

SUMMARY

In accordance with a broad aspect, there is provided method for governing an aircraft propeller of an engine. The method comprises obtaining a fluid flow command for speed control of the propeller, determining pulse parameters of a pulse width modulated valve control signal for actuating a two-position solenoid valve in accordance with the fluid flow command based on an average fluid flow through the solenoid valve and an opening and closing time of the solenoid valve, generating the valve control signal with the pulse parameters as determined, and transmitting the valve control signal to the solenoid valve for actuating the solenoid valve, thereby controlling the speed of the propeller.

In accordance with another broad aspect, there is provided system for governing an aircraft propeller of an engine. The system comprises a processing unit and a non-transitory computer-readable storage medium having stored thereon program instructions. The program instructions are executable by the processing unit for obtaining a fluid flow command for speed control of the propeller, determining pulse parameters of a pulse width modulated valve control signal for actuating a two-position solenoid valve in accordance with the fluid flow command based on an average fluid flow through the solenoid valve and an opening and closing time of the solenoid valve, generating the valve control signal with the pulse parameters as determined, and transmitting the valve control signal to the solenoid valve for actuating the solenoid valve, thereby controlling the speed of the propeller.

In accordance with yet another broad aspect, there is provided aircraft propeller governing assembly. The assembly comprises an aircraft propeller, an actuator coupled to the aircraft propeller and comprising a two-position solenoid valve for controlling fluid flow to the aircraft propeller, and a controller coupled to the actuator. The controller is configured for obtaining a fluid flow command for speed control of the propeller, determining pulse parameters of a pulse width modulated valve control signal for actuating a two-position solenoid valve in accordance with the fluid flow command based on an average fluid flow through the solenoid valve and an opening and closing time of the solenoid valve, generating the valve control signal with the pulse parameters as determined, and transmitting the valve control signal to the solenoid valve for actuating the solenoid valve, thereby controlling the speed of the propeller.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 8 is a block diagram of a system for propeller governing, in accordance with one or more illustrative embodiments.

It will be noted that throughout the appended drawings, like features are identified by like reference numerals.

DETAILED DESCRIPTION

There are described herein methods, system, and assemblies for propeller governing, which can be used as primary control means or secondary control means for the propeller. The propeller forms part of an engine, such as those found in aircraft as well as for other industrial applications such as for compressor drivers, ship propulsion and electric power, and locomotives. The engine may be a gas turbine engine, a hybrid-electric engine, a turbo-compounded engine, or any suitable propulsion system.

Figure 1:
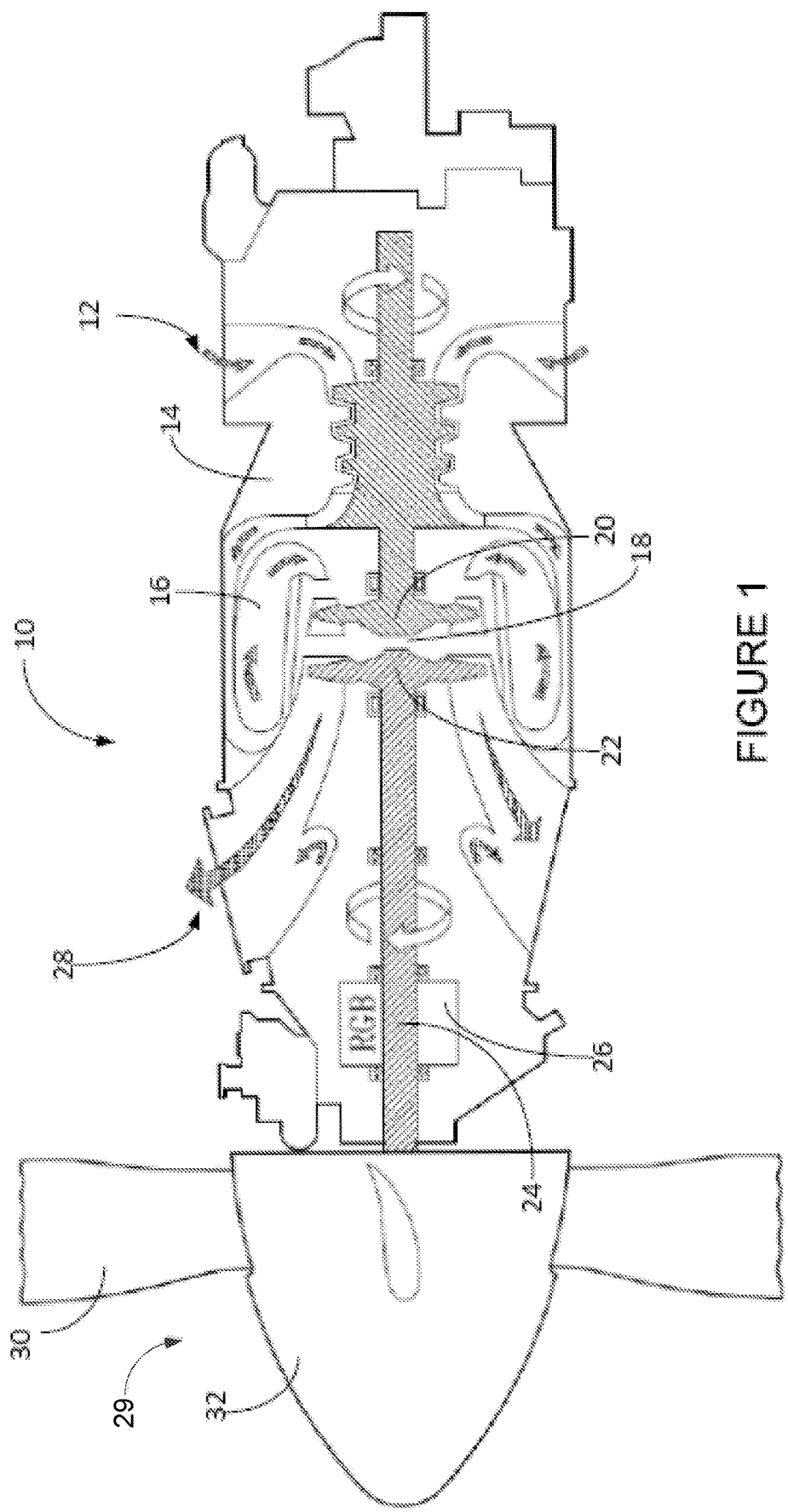
FIG. 1 is a schematic cross-sectional view of an engine, in accordance with one or more illustrative embodiments.

FIG. 1 illustrates an exemplary engine 10, which is a gas turbine engine. The engine 10 comprises an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and drives the rotor shaft 24 through the reduction gearbox (RGB) 26. Hot gases may then be evacuated through exhaust stubs 28.

A propeller 29, through which ambient air is propelled, is composed of a propeller hub 32 and blades 30. The propeller 29 converts rotary motion from the engine 10 to provide propulsive force to the aircraft. Propeller 29 is a constant speed propeller, meaning that it is designed to automatically change its blade angle (or blade pitch) to allow it to maintain a constant rotational speed, regardless of the amount of engine torque being produced, the speed of the aircraft, or the altitude at which the aircraft is flying. Other configurations for a turboprop engine may also apply.

Figure 2:
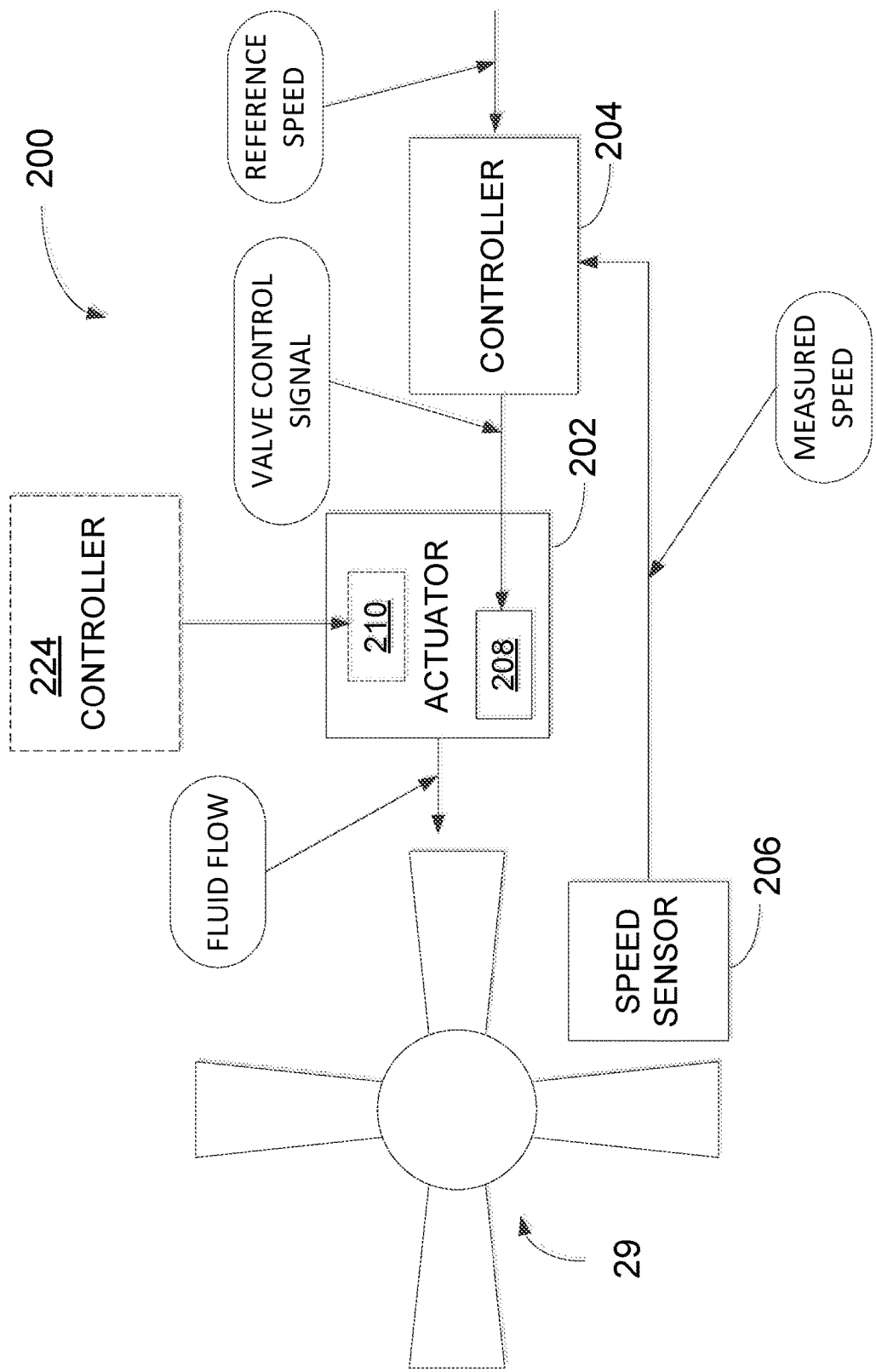
FIG. 2 is a block diagram of an assembly for propeller governing, in accordance with one or more illustrative embodiments.

Referring to FIG. 2, there is illustrated an example embodiment of a propeller governing assembly 200. A controller 204 receives a reference speed to which the propeller 29 is to be set. The controller 204 regulates fluid flow, such as oil, to the propeller 29 via an actuator 202 in accordance with the reference speed. A valve control signal is transmitted by the controller 204 to the actuator 202 and the actuator responds by regulating fluid flow to the propeller 29 accordingly.

One or more sensors 206 provide the controller 204 with the propeller's actual speed as measured. When the propeller's actual speed deviates from the reference speed, the controller 204 responds with a change in blade angle. The actuator 202 is commanded to direct fluid under pressure to the propeller 29 or to release (i.e. remove) fluid from the propeller 29. The change in fluid volume going to the propeller 29 changes the blade angle and modifies the propeller speed.

The actuator 202 may regulate fluid flow to and from the propeller 29 via a two-position solenoid valve 208. The two position solenoid valve 208 may be used as a secondary means of propeller governing in case of failure to a primary means, such as a proportional valve 210, which is controlled by a separate controller 224 via a separate valve control signal. Alternatively, the two-position solenoid valve 208 may be used as a primary means of propeller governing.

In some embodiments, the two-position solenoid valve 208 is a feathering solenoid valve, used to initiate feathering of the propeller 29. When the feathering solenoid is energized, it allows oil to flow out of the propeller dome until the propeller 29 is completely feathered. Alternatively, the two-position solenoid valve 210 is a separate valve independent of the feathering solenoid.

The two-position solenoid valve 208 is controlled using pulse width modulation (PWM). The valve 208 is periodically switched from zero (off) to high (on) by the controller 204 via the valve control signal, and a modulation of the duration of these two values achieves the required control over the fluid flow.

As the two-position solenoid valve 208 has a slow response time, the period of the signal is set to allow the valve 208 to fully open and fully close within one pulse cycle, thus preventing slewing of the valve 208 over multiple cycles. In some embodiments, low frequency pulses are used to actuate the valve 208, meaning that pulses of about 1 Hz to about 6 Hz are used. In some embodiments, the pulses have a frequency of 5 Hz.

The inability to set the valve 208 to intermediate positions is addressed by considering the average fluid flow through the valve when it is opened in order to regulate fluid flow precisely. More specifically, pulse parameters of the valve control signal, such as duration, duty cycle, and/or on-time, are related to the expected average fluid flow through the valve 208 over a pulse cycle. In some embodiments, the relationship may be established for more than one pulse cycle.

Figure 3:
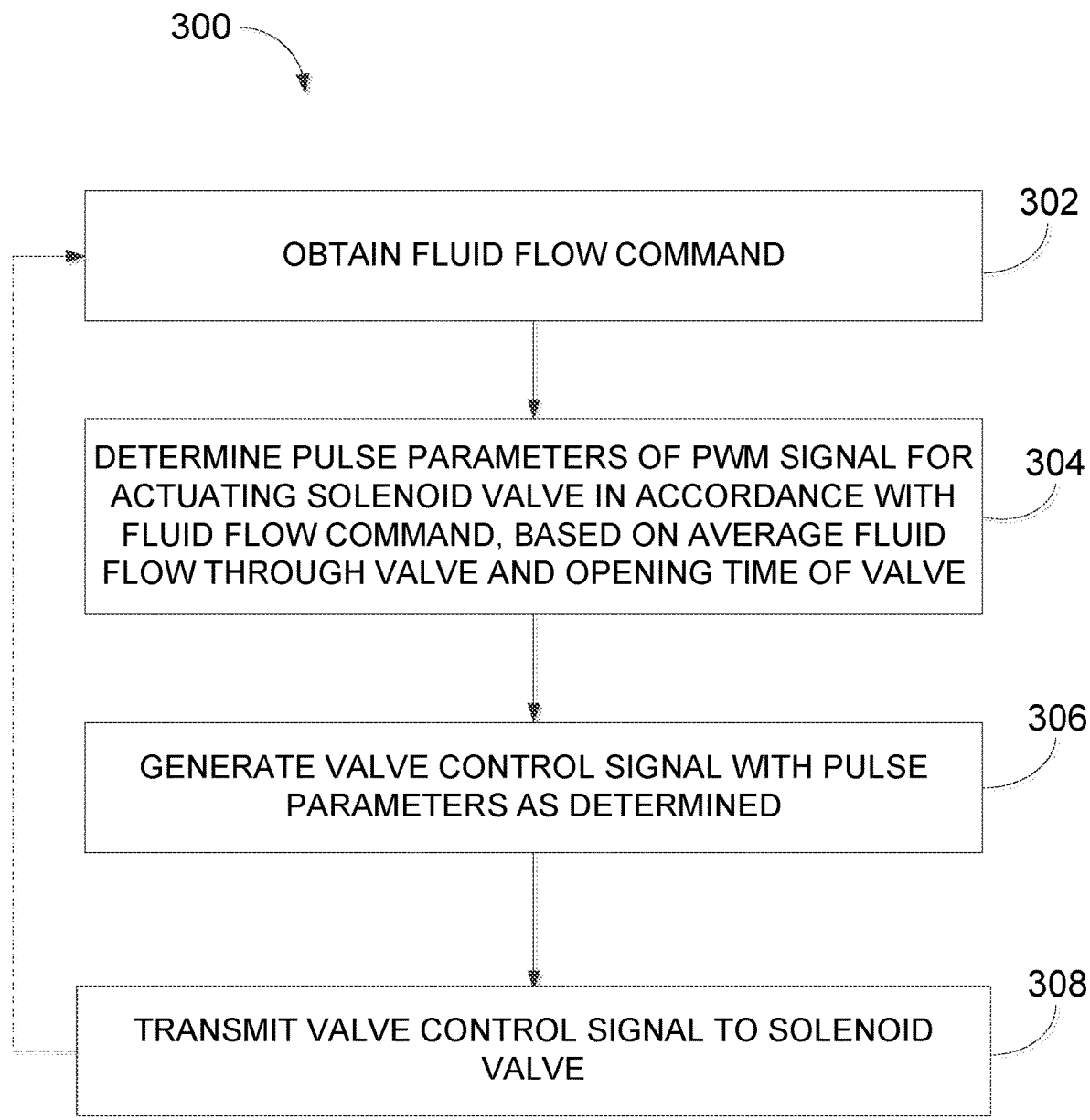
FIG. 3 is a flowchart of a method for propeller governing, in accordance with one or more illustrative embodiments.

Referring to FIG. 3, an example method 300 for propeller governing is illustrated. At step 302, a fluid flow command is obtained. The fluid flow command corresponds to a desired change in a rate of change of the propeller blades. In some embodiments, the fluid flow command is received as an input. Alternatively, obtaining the fluid flow command comprises determining the fluid flow command on the basis of the reference speed and the measured speed.

At step 304, the pulse parameters for a PWM valve control signal are determined, so as to actuate the valve 208 in a manner to obtain a fluid flow through the valve that corresponds to the fluid flow command. The average fluid flow through the solenoid valve 208 and the time it takes for the solenoid valve 208 to open and close are used to determine the pulse parameters of the PWM valve control signal that will result in the desired fluid flow through the valve. The pulse parameters that are set may be one or more of pulse on-time, pulse period, pulse frequency, and pulse duty cycle. In some embodiments, two or more pulses are used to obtain the desired fluid flow through the solenoid valve 208.

Figure 4:
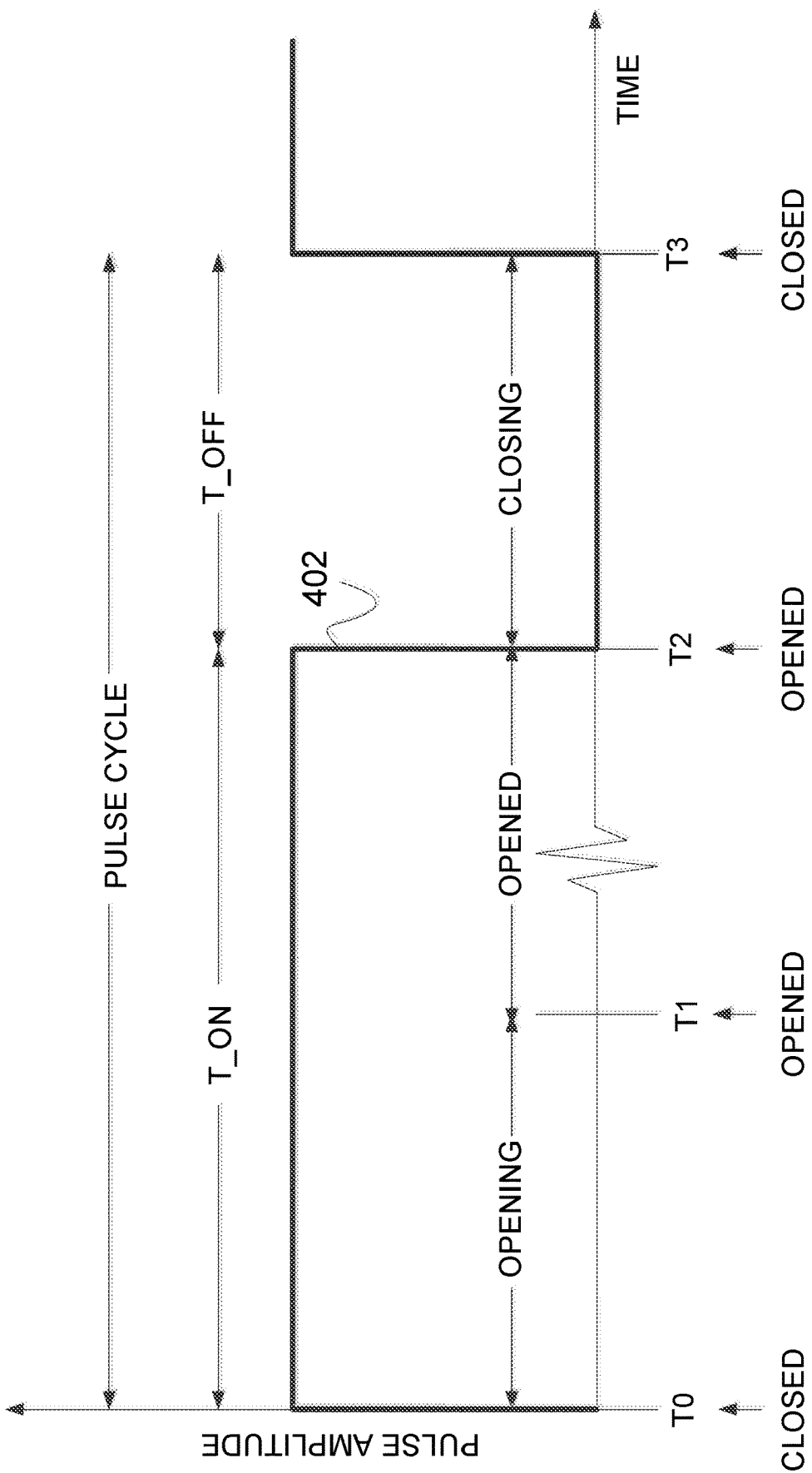
FIG. 4 is a graphical representation of a pulse from a valve control signal, in accordance with one or more illustrative embodiments.

Referring to FIG. 4, an example pulse 402 of a valve control signal is illustrated. The pulse 402 is composed of an on-time (T_ON) portion and an off-time (T_OFF) portion. T_ON corresponds to the time during which the valve 208 is commanded to open, T_OFF corresponds to the time during which the valve 208 is commanded to close. The duration of time for the valve 208 to open is found between T0 and T1. T1 thus corresponds to the moment in time when the valve 208 is fully opened. The duration of time for the valve 208 to close is found between T2 and T3. Valve opening and closing times are fixed and predetermined for a given solenoid valve 208. For example, simulations or tests may be performed to determine the valve opening and closing times. Alternatively, or in combination therewith, valve specifications may be used to determine valve opening and closing times.

The portion of the pulse 402 found between T1 and T2 corresponds to the time during which the valve 208 is fully opened, and fluid flows freely through the valve 208. The duration of T1 to T2 varies as a function of the fluid flow command. More specifically, the valve 208 is kept open for longer or shorter time periods depending on how much fluid it is desired to send to or remove from the propeller 29. As a result, T_ON is of a varying duration that is set in accordance with a desired fluid flow.

The value of T_ON is set based on the average fluid flow through the solenoid valve 208 and the opening time of the solenoid valve 208. In some embodiments, average fluid flow for a given pulse on-time at a given pulse frequency is predetermined, for example by performing simulations or tests. In some embodiments, valve specifications may also be used to determine the average fluid flow through the valve 208.

An example is illustrated at Table 1 for a valve having an opening time of 75 ms and a closing time of 75 ms.

TABLE 1

| AVERAGE FLUID FLOW | PULSE ON-TIME |
|---|---|
| −3 in^3/s | 50 ms |
| 0 in^3/s | 70 ms |
| 3 in^3/s | 100 ms |
| 7 in^3/s | 200 ms |

In this example, 20 mL of fluid flows through the valve 208 when the pulse on-time is 100 ms and 61 mL of fluid flows through the valve 208 when the pulse on-time is 175 ms. Given the valve opening time of 75 ms, this means that the valve is maintained fully opened for 25 ms and 100 ms, respectively. As the valve closing time is fixed at 75 ms, the pulse duration is 175 ms and 250 ms, respectively. Intermediate values for pulse on-time and average fluid flow are also provided in the Table. All values presented herein are for illustrative purposes only.

In some embodiments, the controller 204 is configured to perform a computation based on specifications of the valve 208 to find the appropriate pulse parameters for the PWM valve control signal for the fluid flow command. Alternatively, the controller 204 accesses a lookup table, cache, or other storage medium having pre-stored associated pairs of pulse parameters and average fluid flow values for a given valve 208. In some embodiments, certain parameters, such as pulse period (or frequency), are predetermined while other parameters, such as pulse on-time, are determined dynamically by the controller 204, either through computation or via a lookup table. In other embodiments, none of the parameters are predetermined and the controller is configured to determine all of the pulse parameters dynamically based on the fluid flow command and known valve specifications.

Referring back to FIG. 3, at step 306, the valve control signal is generated with the pulse parameters as determined at step 304. At step 308, the valve control signal is transmitted to the solenoid valve 208 for actuating the solenoid valve 208 in accordance with the fluid flow command, thereby controlling the speed of the propeller 29 by varying the blade angles.

Figure 5:
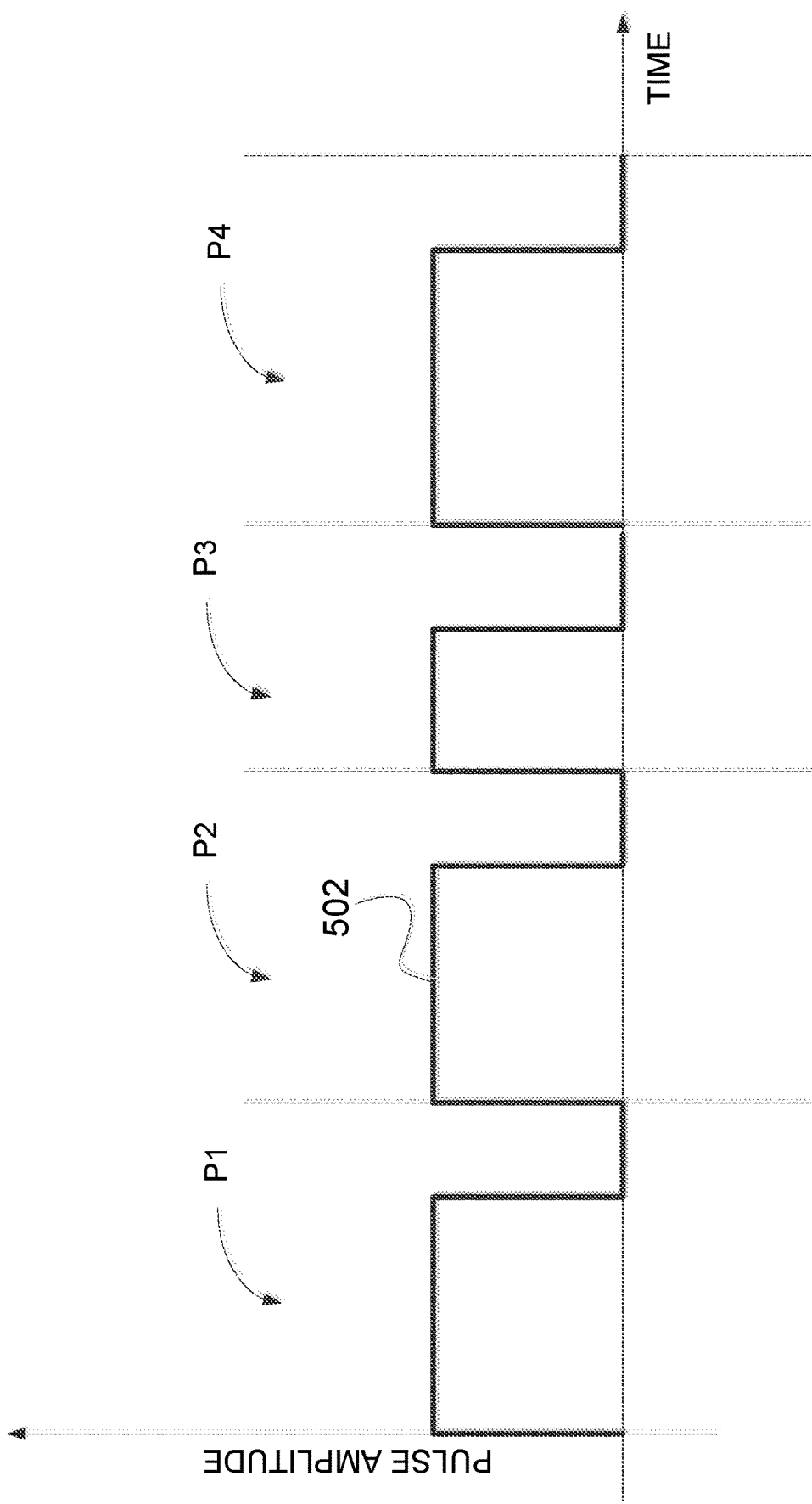
FIG. 5 is a graphical representation of a valve control signal having multiple pulses, in accordance with one or more illustrative embodiments.

In some embodiments, the method 300 is iterative and a continuous valve control signal is built. An example of a multi-pulse valve control signal 502 is shown in FIG. 5.

In some embodiments, all of the pulse parameters of P1 are held for multiple pulses, i.e. one or more of pulses P2-P4 following P1 have the same pulse parameters as P1. As stated above, pulse parameters may include one or more of on-time, duty cycle, period, and frequency.

In some embodiments, some of the parameters of P1 are held for multiple pulses while other parameters of P1 are changed for P2, P3, and/or P4. For example, the period of pulses P2-P4 is maintained as per P1 while the on-time of P2, P3, P4 is changed from that of P1.

In some embodiments, the fluid flow command is fulfilled via multiple pulses (i.e. a continuous valve control signal) and the controller 204 is configured to determine the corresponding parameters to fulfill the fluid flow command. In some embodiments, the controller 204 is configured to determine the pulse parameters of a single pulse to fulfill the fluid flow command.

Figure 6:
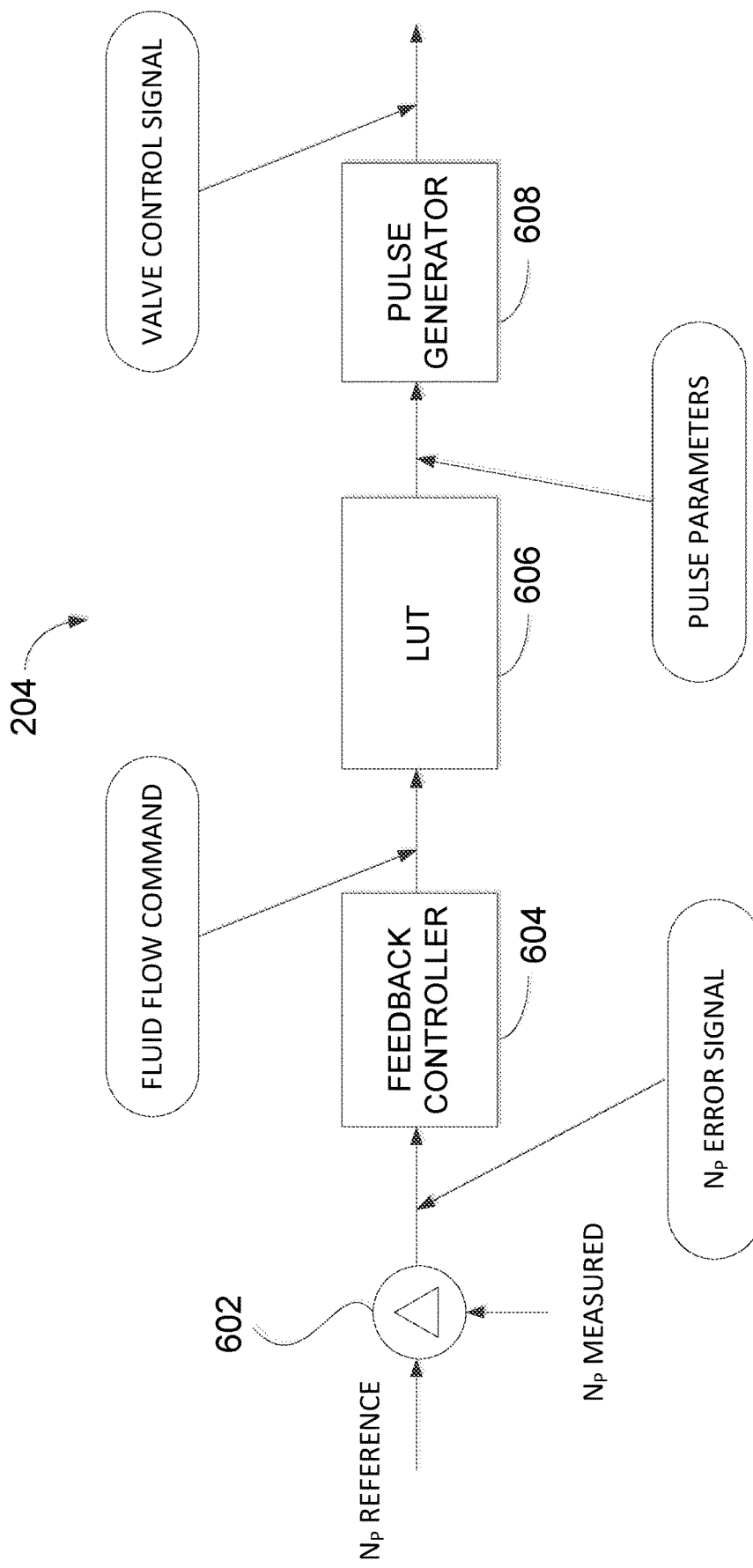
FIG. 6 is a block diagram of a controller from the propeller governing assembly of FIG. 2, in accordance with one or more illustrative embodiments.

Turning to FIG. 6, there is illustrated an example embodiment of the controller 204. The feedback controller 604 may take any form so as to operate as a control loop feedback mechanism, such as but not limited to a proportional controller, a proportional-derivative controller, and a proportional-integral controller. The feedback controller 604 receives a propeller speed ($N_P$) error signal, which is the result of the difference between the actual propeller speed as measured and the propeller reference speed, as found by subtraction junction 602. In some embodiments, the reference speed is a maximum propeller speed.

In the example illustrated, the fluid flow command is used as input to a lookup table 606 containing associated pairs of average fluid flow and pulse on-time for a given pulse period (or a given pulse frequency). Selected pulse parameters, including the pulse on-time, are provided to a pulse generator 608 for generating the PWM pulse and outputting the valve control signal for transmission to the solenoid valve 208. The lookup table 606 may be built offline, using simulations and/or tests and based on characteristics of the engine 10, propeller 29, and/or solenoid valve 208.

Figure 7:
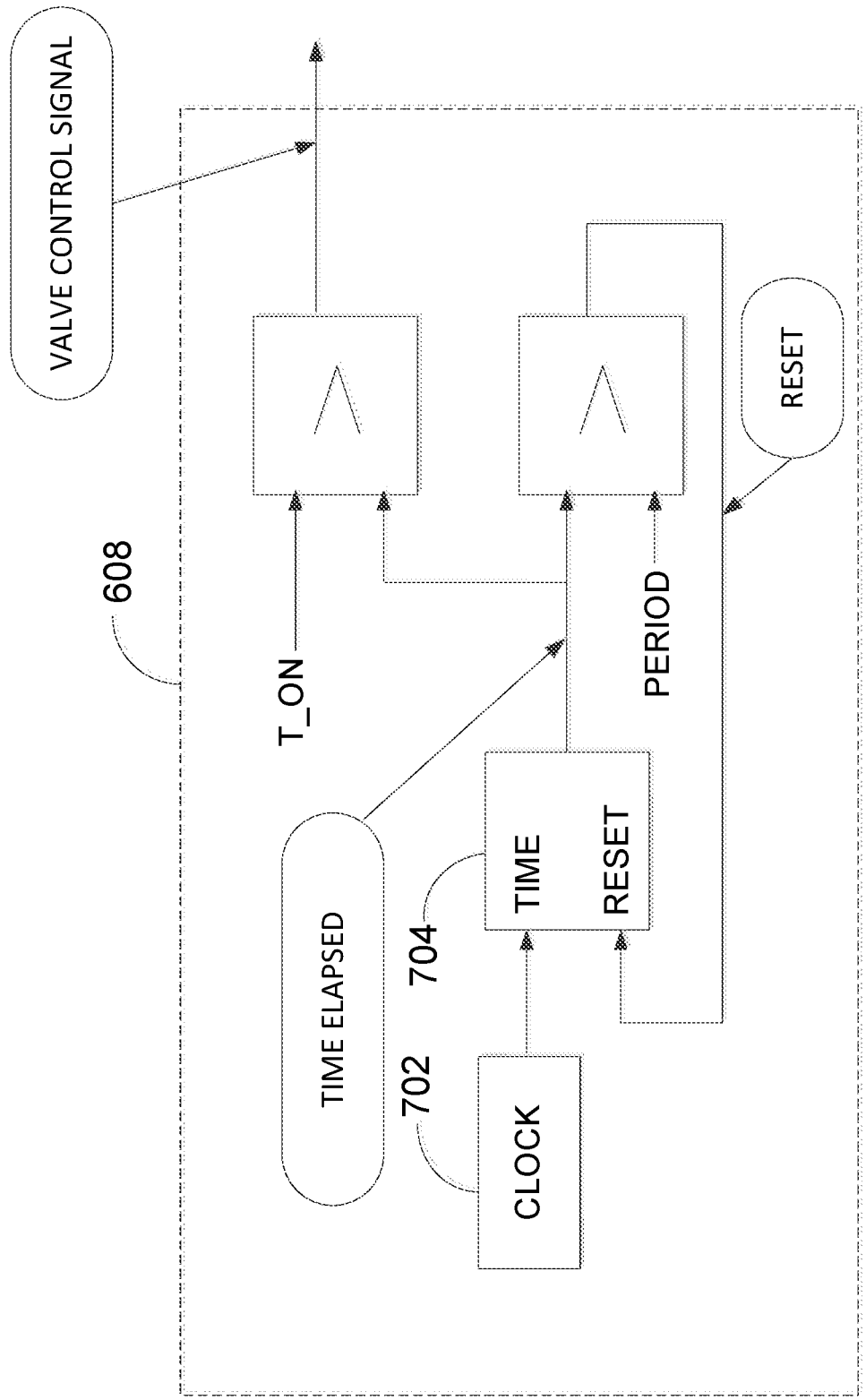
FIG. 7 is a block diagram of a pulse generator from the controller of FIG. 6, in accordance with one or more illustrative embodiments.

An example embodiment of the pulse generator 608 is illustrated in FIG. 7. A set of logic components may be used to build the valve control signal as a Boolean signal that respects a ratio of true/false (or high/low) dictated by the on-time of the pulse (T_ON) and the period of the pulse (or the frequency). A counter 704 determines a time elapsed since a last reset using a time input from a clock 702. If the time elapsed is greater than the period of the pulse, the reset signal is sent to the counter 704. If the time elapsed is less than the on-time of the pulse, the valve control signal is set to high (or true). If the time elapsed is greater than the on-time of the pulse, the valve control signal is set to low (or false). Other implementations for the pulse generator 608 are also considered and the example of FIG. 7 is merely illustrative.

In some embodiments, the controller 204 is implemented by means of one or more computing devices 800, as illustrated in FIG. 8. The computing device 800 comprises a processing unit 812 and a memory 814 which has stored therein computer-executable instructions 816. The processing unit 812 may comprise any suitable devices configured to implement the method 300 such that instructions 816, when executed by the computing device 800 or other programmable apparatus, may cause the functions/acts/steps performed as part of the method 300 as described herein to be executed. The processing unit 812 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may comprise any storage means (e.g., devices) suitable for retrievably storing machine-readable instructions 816 executable by processing unit 812. Note that the computing device 800 can be implemented as part of a full-authority digital engine controls (FADEC) or other similar device, including electronic engine control (EEC), engine control unit (EUC), electronic propeller control, propeller control unit, and the like.

The methods and systems for propeller governing as described herein may be implemented in a high level procedural or object oriented programming or scripting language, or a combination thereof, to communicate with or assist in the operation of a computer system, for example the computing device 800. Alternatively, the methods and systems for propeller governing may be implemented in assembly or machine language. The language may be a compiled or interpreted language. Program code for implementing the methods and systems for propeller governing may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for propeller governing may also be considered to be implemented by way of a non-transitory computer-readable storage medium having a computer program stored thereon. The computer program may comprise computer-readable instructions which cause a computer, or more specifically the processing unit 812 of the computing device 800, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. For example, the systems and methods are described for single acting propeller systems but may be adapted to dual acting propellers. Still other modifications which fall within the scope of the present invention will be apparent to those skilled in the art, in light of a review of this disclosure.

Various aspects of the methods and systems for propeller governing may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for governing an aircraft propeller of an engine, the method comprising:
   obtaining a fluid flow command for speed control of the propeller;
   determining pulse parameters of a pulse width modulated valve control signal for actuating a two-position solenoid valve in accordance with the fluid flow command based on an average fluid flow through the solenoid valve and an opening and closing time of the solenoid valve;
   generating the valve control signal with the pulse parameters as determined; and
   transmitting the valve control signal to the solenoid valve for actuating the solenoid valve to control the speed of the propeller.

2. The method of claim 1, wherein determining pulse parameters comprises determining a pulse on-time for a given pulse period, the pulse on-time including the opening time of the two-position solenoid valve from a closed position to a fully open position of the two-position solenoid valve.

3. The method of claim 2, wherein determining the pulse on-time comprises selecting the pulse on-time from a look-up table having a plurality of on-times each associated with a corresponding average fluid flow through the solenoid valve, for the given pulse period.

4. The method of claim 1, wherein obtaining the fluid flow command comprises determining the fluid flow command based on a difference between an actual propeller speed and a reference propeller speed.

5. The method of claim 4, wherein the reference propeller speed is a maximum propeller speed.

6. The method of claim 1, wherein the two-position solenoid valve is a feather solenoid valve.

7. The method of claim 1, wherein:
   determining pulse parameters comprises setting a frequency for the valve control signal that is less than or equal to 5 Hz; and
   the frequency includes a pulse cycle duration including:
      the opening time of the two-position solenoid valve from a closed position to a fully open position of the two-position solenoid valve;
      a duration of the two-position solenoid valve being fully opened when fluid flows freely through the two-position solenoid valve; and
      the closing time of the two-position solenoid valve.

8. The method of claim 1, wherein determining pulse parameters comprises fulfilling the fluid flow command over a plurality of pulses, and setting the pulse parameters accordingly.

9. A system for governing an aircraft propeller of an engine, the system comprising:
   a two-position solenoid valve;
   a processing unit; and
   a non-transitory computer-readable storage medium having stored thereon program instructions executable by the processing unit for:
      obtaining a fluid flow command for speed control of the propeller;
      determining pulse parameters of a pulse width modulated valve control signal for actuating a two-position solenoid valve in accordance with the fluid flow command based on an average fluid flow through the solenoid valve and an opening and closing time of the solenoid valve;
      generating the valve control signal with the pulse parameters as determined; and
      transmitting the valve control signal to the solenoid valve for actuating the solenoid valve to control the speed of the propeller.

10. The system of claim 9, wherein determining pulse parameters comprises determining a pulse on-time for a given pulse period.

11. The system of claim 10, wherein determining the pulse on-time comprises selecting the pulse on-time from a look-up table having a plurality of on-times each associated with a corresponding average fluid flow through the solenoid valve, for the given pulse period.

12. The system of claim 9, wherein obtaining the fluid flow command comprises determining the fluid flow command based on a difference between an actual propeller speed and a reference propeller speed.

13. The system of claim 12, wherein the reference propeller speed is a maximum propeller speed.

14. The system of claim 9, wherein the two-position solenoid valve is a feather solenoid valve.

15. The system of claim 9, wherein determining pulse parameters comprises setting a frequency for the valve control signal that is less than or equal to 5 Hz.

16. The system of claim 9, wherein determining pulse parameters comprises fulfilling the fluid flow command over a plurality of pulses, and setting the pulse parameters accordingly.

17. An aircraft propeller governing assembly comprising:
an aircraft propeller;
an actuator coupled to the aircraft propeller and comprising a two-position solenoid valve for controlling fluid flow to the aircraft propeller; and
a controller coupled to the actuator and configured for:
obtaining a fluid flow command for speed control of the propeller;
determining pulse parameters of a pulse width modulated valve control signal for actuating a two-position solenoid valve in accordance with the fluid flow command based on an average fluid flow through the solenoid valve and an opening and closing time of the solenoid valve;
generating the valve control signal with the pulse parameters as determined; and
transmitting the valve control signal to the solenoid valve for actuating the solenoid valve to control the speed of the propeller.

18. The assembly of claim 17, wherein the solenoid valve is a feather solenoid valve.

19. The assembly of claim 17, wherein the two-position solenoid valve is a secondary means of controlling the aircraft propeller and is enabled upon failure of a primary means including a proportional valve.

20. The assembly of claim 17, wherein determining pulse parameters comprises determining a pulse on-time for a given pulse period.

* * * * *